United States Patent [19]

Lambert

[11] Patent Number: 4,508,461
[45] Date of Patent: Apr. 2, 1985

[54] DISTRIBUTED FIBER OPTIC TEMPERATURE MONITORING APPARATUS AND METHOD

[75] Inventor: James L. Lambert, Shaler Township, Allegheny County, Pa.

[73] Assignee: Westinghouse Electric Corp., Pittsburgh, Pa.

[21] Appl. No.: 304,761

[22] Filed: Sep. 22, 1981

[51] Int. Cl.³ .......................... G01J 5/01; G01J 5/10
[52] U.S. Cl. .................................. 374/161; 219/487; 356/44; 356/432; 374/164; 374/170
[58] Field of Search ............... 374/126, 137, 131, 123, 374/164, 152, 128, 129, 2, 161, 4, 5; 350/96.33; 356/44, 73.1, 234; 219/487

[56] References Cited

U.S. PATENT DOCUMENTS

| | | | |
|---|---|---|---|
| 3,401,551 | 9/1968 | Maley | 374/5 |
| 3,498,132 | 3/1970 | Smith et al. | 374/131 X |
| 4,151,747 | 5/1979 | Gottlieb et al. | 356/44 X |
| 4,158,965 | 6/1979 | Prosky | 374/164 |
| 4,183,666 | 1/1980 | Tahara et al. | 356/73.1 |
| 4,201,446 | 5/1980 | Geddes et al. | 374/161 |
| 4,203,326 | 5/1980 | Gottlieb et al. | 374/123 X |
| 4,215,275 | 7/1980 | Wickersheim | 374/152 X |
| 4,278,349 | 7/1981 | Sander | 356/45 X |
| 4,283,934 | 8/1981 | Siess | 374/126 |
| 4,298,794 | 11/1981 | Snitzer et al. | 374/161 X |
| 4,302,970 | 12/1981 | Snitzer et al. | 374/161 |
| 4,307,607 | 12/1981 | Saaski et al. | 374/161 |
| 4,313,344 | 2/1982 | Brogardh et al. | 374/131 |
| 4,316,388 | 2/1982 | Miller et al. | 374/161 |
| 4,349,276 | 9/1982 | Di Vita | 356/73.1 |
| 4,362,057 | 12/1982 | Gottlieb et al. | 374/6 |

OTHER PUBLICATIONS

Military Standard, "Fiber Optics Test Method and Instrumentation", 11/1977, DOD-STD-1678, pp. 6020-1 to 6020-3, 6-7.

Primary Examiner—Daniel M. Yasich
Attorney, Agent, or Firm—William D. Lanyi

[57] ABSTRACT

An apparatus and method is described that determines the temperature distribution of an environment proximate a cable of optical fibers. No additional transducers are required to be inserted within the environment and the presence of electrical magnetic fields does not adversely affect the operation or results of the temperature measurement. The characteristic of materials which enables them to generate spontaneous thermal radiation as a function of their temperature is used to map the temperatures along the cable. A plurality of optical fibers, each having a measurably distinct absorption constant, are used in order to generate a sufficient number of known parameters to enable the temperature of a number of zones to be determined along the length of the cable. Measurement accuracy can be enhanced by the use of known heat sources in the choice of temperature zone dimensioning.

8 Claims, 7 Drawing Figures

DISTRIBUTED FIBER OPTIC TEMPERATURE MONITORING APPARATUS AND METHOD

BACKGROUND AND SUMMARY OF THE INVENTION

The present invention relates to the monitoring of temperature and, more particularly, the measuring of temperature distributions within electrical equipment.

In order to protect electrical equipment from being damaged by localized overheating conditions, it is important that the temperature of internal components of the equipment be continually monitored. However, conventional temperature measuring techniques can be adversely affected by electrical fields that exist within the equipment being monitored and, in some situations, it is difficult to position conventional transducers within the equipment because of spatial restrictions.

The advent of fiber optics has partially solved these problems by providing a lightweight, nonconductive means for conveying temperature transducer signals from within the electrical equipment to remotely located monitoring devices. However, present measuring techniques which utilize fiber optics still typically require a transducer or light source to be located within the electrical equipment.

The distinction between the present invention and most known methods which utilize optical fibers to measure temperature is that conventional techniques use optical fibers to transmit signals from temperature transducers or light sources whereas the optical fibers of the present invention serve as both the transducers which generate temperature related signals and the means for transmitting the signals to a remote receiver. U.S. Pat. No. 4,203,326 issued to Gottlieb, et al on May 20, 1980 and U.S. Pat. No. 4,151,747 issued to Gottlieb, et al on May 1, 1979 both utilize external light sources to measure temperature as a function of its effect on the light transmission capability of optical fibers.

Implementation of the present invention requires only that the optical fibers be disposed within the environment whose temperature is being measured. The optical fibers are arranged in a bundle, or cable. The cable is extended into the environment being monitored, such as the interior of an electrical generator, with proper fastening means to insure the cable's stationary position. Prior to sealing the environment, if that's necessary, the locations on the cable which are proximate various selected internal components of the generator are recorded as a function of their distance from one end of the cable in order that measured temperatures can later be related to cable position and, thus, to specific internal components.

One end of the cable, having been extended from the environment being monitored, is connected to equipment that is capable of measuring the thermal radiation emanating from each of the optical fibers in the cable. The present invention utilizes the physical characteristic of the optical fibers which enables them to generate spontaneous thermal radiation in response to, and as a function of, their temperature. Since the cable and its fibers will tend to achieve a temperature equilibrium with the surrounding environment, a temperature distribution of the surrounding environment can effectively be mapped from the temperature distribution of the cable in accordance with the present invention.

The number of fibers required to be included in the cable is directly proportional to the accuracy and resolution desired in the ability to pinpoint locations along the cable where a temperature to be measured exists and also to its capability to precisely measure the magnitude of the temperature at those locations.

Using the equipment described above, each fiber can be mathematically divided into a predetermined number of segments or zones. This number of zones is the same for each fiber and is equal to the number of fibers in the bundle. By requiring each fiber of the cable to have an absorption constant which is distinct from all other fibers in the cable, each of these fiber segments or zones can be assigned a variable that represents its unknown contribution to the sum total of radiation emanating from the fiber's end and the resulting simultaneous equations will have a unique solution which gives the temperature for each of the above described segments. It should be apparent that the average length of the zones is equal to the length of the cable divided by the number of fibers in the cable.

The present invention provides a means for monitoring the temperature variations along a cable of optical fibers without the need for any other transducers, light sources or transmitting equipment within the environment being monitored.

BRIEF DESCRIPTION OF THE DRAWING

The present invention can best be understood from a reading of the following description of the preferred embodiment in conjunction with the figures, in which.

DESCRIPTION OF THE PREFERRED EMBODIMENT

The present invention relates to the measurement of temperatures within an environment and, more particularly, to the mapping of the temperature distribution of an environment which is proximate a cable of optical fibers produced and utilized in accordance with the present invention.

A description of a temperature sensing apparatus and method of operation in accordance with the present invention can best be made with reference to well established theories of black body radiation and the properties of optical fibers as they are utilized in the present invention.

Figure 1:
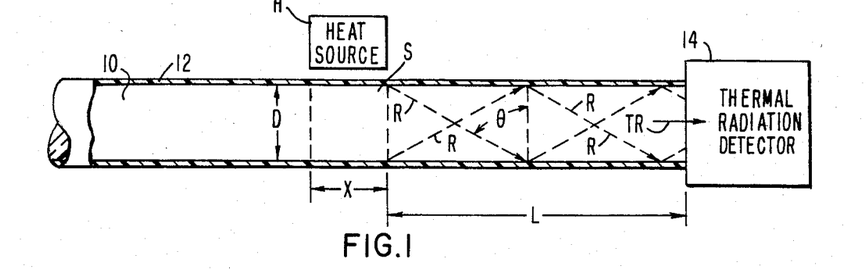
FIG. 1 illustrates the effect of an external heat source on a single optical fiber.

FIG. 1 depicts an optical fiber 10 whose circumferential surface is covered with a cladding 12. One end of the fiber 10 is functionally associated with a thermal radiation detector 14 which is capable of measuring thermal radiation TR between preselected wavelengths, $\lambda_S$ and $\lambda_L$.

In FIG. 1 a heat source H is shown located adjacent to a section S of the clad optical fiber 10. The optical fiber 10 tends to achieve thermal equilibrium with its environment. The section S, in response to the heat source H, thus reaches a temperature which is higher than the rest of the fiber 10 and is approximately equal to the temperature of the heat source H. This increased temperature causes the section S to generate or emit thermal radiation TR, not merely as a glowing, opaque surface but essentially as a black body cavity radiator whose temperature can be determined. As such, this type of temperature sensor, which comprises a single optical fiber and a thermal radiation detector as illustrated in FIG. 1, can be used to determine the temperature of any location along the optical fiber's length, without the need of a light source, when only one heat source H exists along the fiber's length. A temperature sensor of this type is disclosed in U.S. Pat. No. 4,362,057 which issued to Gottlieb et al. on Dec. 7, 1982.

The magnitude of the signal TR caused by the segment S and received by the thermal radiation detector 14, when there exists only one heated segment, is defined as $$TR = A(1 - e^{-\alpha X})e^{-\alpha L} \int_{\lambda_s}^{\lambda_l} \frac{C_1 d\lambda}{\lambda^5(e^{C_2/\lambda T} - 1)} \quad (1)$$

where T is the temperature of segment S, TR is the thermal radiation signal received at the detector end of the fiber, $\alpha$ is the absorption constant of the optical fiber 10, X is the length of the heated segment of the fiber, $\lambda_s$ and $\lambda_l$ are the smallest and largest wavelengths capable of being measured by the thermal radiation detector being used, L is the length from the end of the fiber to the closest edge of the heated segment with $C_1$, $C_2$ and A being defined as follows:

$$A = (\pi D^2/4)\left(1 - \frac{N_{cladding}}{N_{fiber}}\right) \quad (2)$$

$$C_1 = 2\pi c^2 h \quad (3)$$
$$C_2 = hc/k \quad (4)$$

where D is the diameter of the fiber 10, $N_{cladding}$ is the refractive index of the cladding 12, $N_{fiber}$ is the refractive index of the fiber 10, c is the speed of light, h is Planck's constant ($6.624 \times 10^{-27}$ erg second) and k is Boltsmann's constant ($1.3803 \times 10^{-6}$ ergs per degree centigrade).

Equation 1 comprises four portions which are described below. An ideal black body cavity radiator emits radiation in all directions with a total power, P, defined as $$P = \int_0^\infty \frac{C_1 d\lambda}{\lambda^5(e^{C_2/\lambda T} - 1)} \quad (5)$$

however, only the radiation which emanates through the circular aperture defined by the cross-sectional area of segment S facing the detector 14 can be measured by the detector. It should be apparent to those skilled in the art that equation 5 defines the power of all wavelengths from zero to infinity, whereas equation 1 defines the power within the sensitivity range of the thermal radiation detector being used, namely $\lambda_s$ to $\lambda_l$. Therefore, the measured signal is limited by the factor A defined in equation 2. The factor A also relates to the fact that only radiation R which is emitted in such a direction as to strike the cladding-fiber interface at an angle greater than the angle $\theta$, as shown in FIG. 1, will be guided by the optical fiber 10 to the radiation detector 14. The angle $\theta$ is determined by the refractive indices, $N_{cladding}$ and $N_{fiber}$, of the cladding 12 and the optical fiber 10 and is defined by $$\theta = \sin^{-1}(N_{cladding}/N_{fiber}) \quad (6)$$

with the fraction of the total radiation falling within this angular aperture being equal to $$1 - \sin\theta + 1 - (N_{cladding}/N_{fiber}) \quad (7)$$

Furthermore, the optical fiber 10 is not a pure black body cavity radiator with an emissivity equal to unity but, instead, a radiator with an emissivity less than unity and defined by $$E = (1 - e^{-\alpha X}) \quad (8)$$

where E is the emissivity of the fiber 10. As the emitted radiation travels toward the detector, it is attenuated according to the factor $$e^{-\alpha L} \quad (9)$$

Therefore, equation 1 is a composite function of the radiated power, fiber geometry, emissivity and attenuation functions described above. It is therefore apparent that equation 1 defines the thermal radiation TR that would be measured by a detector 14 that is positioned a distance, L, from a single heated segment S, which has a length X, of an optical fiber 10 surrounded by a cladding 12.

Figure 2:
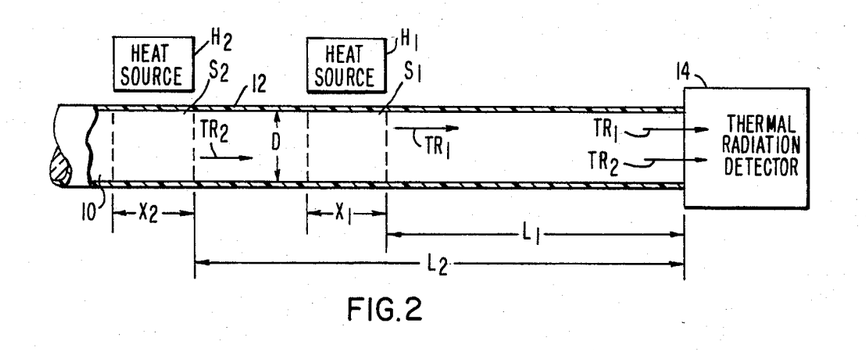
FIG. 2 shows the interrelationship of two external heat sources on a single optical fiber.

If two heated segments, as shown in FIG. 2, exist along the optical fiber, equation 1 must be modified to account for their cumulative effect. To simplify the equations, the symbol W is used to represent the portion of equation 1 shown in equation 5 within the wavelength capability of the detector, $\lambda_S$ to $\lambda_L$. Referring to FIG. 2, two heated segments ($S_1$ and $S_2$) exist in the fiber 10 and are caused by two separate heat sources, $H_1$ and $H_2$, respectively, which are proximate the fiber 10. The total signal received by the detector 14 is therefore defined as $$TR_1 + TR_2 = A(1 - e^{-\alpha X_1})(e^{-\alpha L_1}W_1) + \quad (10)$$
$$A(1 - e^{-\alpha X_2})(e^{-\alpha L_2})W_2$$

where $W_1$ and $W_2$ are the watts per unit volume of radiation generated within $S_1$ and $S_2$, respectively. Equation 10 can be expanded to include n number of segments (i.e. $S_1$, $S_2$, $S_3$ ... $S_n$) along a fiber and become $$TR_{total} = A[(1 - e^{-\alpha X_1})(e^{-\alpha L_1})W_1 + \quad (11)$$
$$(1 - e^{-\alpha X_2})(e^{-\alpha L_2})W_2 \ldots + (1 - e^{-\alpha X_N})(e^{-\alpha L_N})W_n]$$

Figure 3:
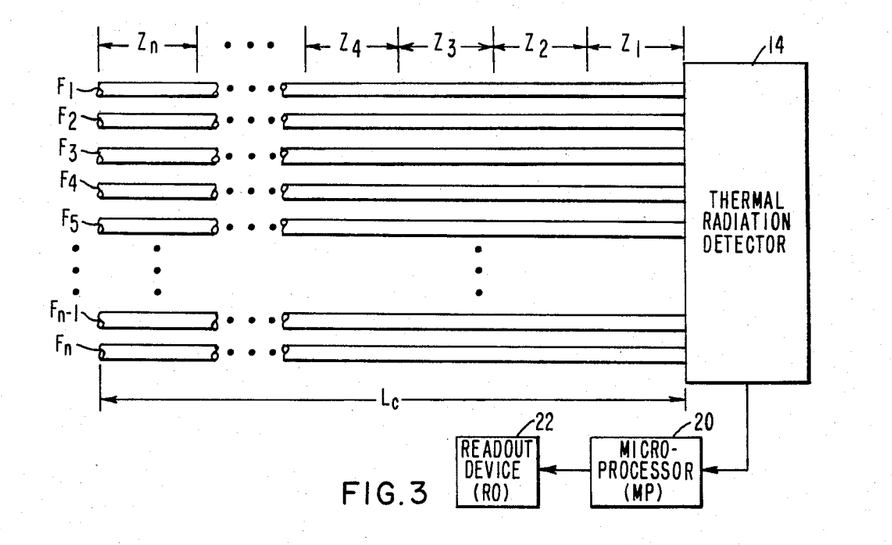
FIG. 3 depicts an exemplary temperature distribution measurement device comprising a plurality of optical fibers and constructed in accordance with the present invention.

Equation 11 thus defines the total thermal radiation $TR_{total}$ that would result from n number of heated segments of an optical fiber. However, due to the plurality of unknowns, equation 11 is not solvable. In order to calculate each W (i.e., $W_1$, $W_2$, $W_3$ ... $W_n$), and thereby determine the temperature of each segment, the present invention uses a plurality of fibers (e.g., $F_1$, $F_2$, $F_3$ ... $F_n$) as shown in FIG. 3. Each optical fiber is specifically chosen to have an absorption constant, $\alpha$, that is measurably distinct from the absorption constant of every other fiber. These measurable differences are a requirement which permits each fiber to behave differently from all of its associated fibers in the bundle since, if any two fibers behaved identically the same, the information that they provide would be redundant. If this were the case, one of these cables would be useless. Although the fibers are shown in FIG. 3 as being spread out from each other in a flat plane, it should be understood that a temperature measuring system made in accordance with the present invention disposes all of the fibers in a bundle or cable in such a way that each single external heat source (e.g., $H_1$ or $H_2$ in FIG. 2) would create a heated segment on each fiber of approximately the same temperature and size. It should further be understood that, for any preselected location on the cable, the fiber length between that preselected location and the thermal radiation detector is essentially identical for every fiber in the cable.

Referring again to FIG. 3, the fibers are associated in a cable of length $L_c$. The number of fibers in the cable is equal to the number of zones (i.e., $Z_1$, $Z_2$, $Z_3$ ... $Z_n$) for which a temperature is to be measured. A thermal radiation detector 14 is connected to one end of each fiber, as shown in FIG. 3, in such a way that it can individually measure the radiation emanating from each of the fibers (i.e., $TR_1$, $TR_2$, $TR_3$ ... $TR_n$). The thermal radiation detector 14 can be of various commercially available types. The type of detector will affect its wavelength sensitivity range. For example, $\lambda_f$ would be 1.8 micrometers for a germanium device, 2.9 micrometers for a lead sulfide device and 4.5 micrometers for a lead selenide device.

If, as described above, each fiber is chosen in such a manner that no two fibers have the same absorption constant, $\alpha$, the n number of fibers will generate n number of equations and permit each individual zone's unknown contribution to the measured radiation to be calculated. The absorption constant of each fiber should be different from that of every other fiber by an amount that will permit their values to be considered distinct from all other fibers. The exact magnitude of difference required is a function of the accuracy capabilities of the measurement and calculation equipment used. A particular technique for selecting absorption constants for each fiber is described in detail below in the discussion relating to equation 15. If the apparatus, shown in FIG. 3, is used to measure the temperature distribution of an environment represented by n number of zones (i.e., $Z_1$, $Z_2$, $Z_3$ ... $Z_n$), n number of fibers are required (i.e., $F_1$, $F_2$, $F_3$ ... $F_{n-1}$, $F_n$). Each fiber is chosen to have a distinct absorption constant (e.g. $F_1$ has $\alpha_1$, $F_2$ has $\alpha_2$, etc.). Therefore, the equation representing the radiation distribution of fiber number 1 would be $$TR_{total\,1} = A(1 - e^{-\alpha_1 X_1})(e^{-\alpha_1 L_1})W_1 + \quad (12)$$
$$A(1 - e^{-\alpha_1 X_2})(e^{-\alpha_1 L_2})W_2 + \ldots +$$
$$A(1 - e^{-\alpha_1 X_n})(e^{-\alpha_1 L_n})W_n$$

the radiation distribution of fiber number 2 would be $$TR_{total\,2} = A(1 - e^{-\alpha_2 X_1})(e^{-\alpha_2 L_1})W_1 + \quad (13)$$
$$A(1 - e^{-\alpha_2 X_2})(e^{-\alpha_2 L_2})W_2 + \ldots +$$
$$A(1 - e^{-\alpha_2 X_n})(e^{-\alpha_2 L_n})W_n$$

and the radiation distribution of fiber number n would be $$TR_{total\,N} = A(1 - e^{-\alpha_n X_1})(e^{-\alpha_n L_1})W_1 + \quad (14)$$
$$A(1 - e^{-\alpha_n X_2})(e^{-\alpha_n L_2})W_2 + \ldots +$$
$$A(1 - e^{-\alpha_n X_n})(e^{-\alpha_n L_n})W_n$$

Since the $\alpha$'s are all distinct and known, the thermal radiation (TR) for each fiber is measured, the dimensions X and L can be chosen to equal any convenient constant values and A is known, the values for the W's can be determined from the n number of simultaneous equations described by equations 12 to 14, above. Since a unique temperature value can be derived from any known value for W, as shown in equation 5, the present invention thereby provides the information necessary to determine the temperature of each zone along the cable length as shown in FIG. 3.

It should be apparent from equation 1 that the total radiation, TR, produced by a heated fiber zone is a function of the absorptivity in two ways. First, equation 8 shows that the emissivity increases as $\alpha$ increases. Secondly, equation 9 demonstrates that the power is increasingly attenuated as $\alpha$ increases. The net effect of these relationships can be determined by taking the partial derivative of equation 1 with respect to $\alpha$ and setting the result equal to zero. This procedure yields the relationship $$\alpha_m = -\left(\frac{1}{x}\right)\ln\frac{L}{L+X} \quad (15)$$

where X is the length of a heated zone, L is the distance from that heated zone to the detector 14 and $\alpha_m$ is the value of absorptivity that will yield the maximum power value resulting from that heated zone. The following table illustrates the approximate relationship of L and $\alpha$ for a variety of lengths, L.

| L | $\alpha_m$ |
| --- | --- |
| 50 cm | 9,000 to 10,000 db/km |
| 100 cm | 7,000 to 8,000 db/km |
| 200 cm | 5,000 to 6,000 db/km |
| 300 cm | 2,000 to 6,000 db/km |
| 400 cm | 1,000 to 2,000 db/km |
| 500 cm | 900 to 1,000 db/km |

Therefore, if the fibers are chosen so that their absorptivities result in each fiber having its maximum power output per heat source location at varying lengths, L, their absorptivities will also be distinct from other fibers whose maximum sensitivities occur at different lengths. Thus, if the fibers are chosen to have significantly different absorption constants, they will also differ significantly in their areas of maximum sensitivity and therefore will improve the operational performance over the entire cable length. It should be apparent that, in order to maintain a zone size, accuracy and resolution, the number of fibers increases greatly as a function of cable length. The number of fibers required is defined as $$n = L_c / Y \tag{16}$$

where Y is the average length of each zone for which a temperature is to be determined and $L_c$ is the length of the cable. Thus, for a given cable length, a decrease in average zone length can be accomplished by an increased number, n, of optical fibers.

As the number of fibers and equations increases, the mathematical solution to the simultaneous equations becomes more cumbersome to achieve. This problem can be alleviated by connecting the thermal radiation detector to a computer 20 which can be a microprocessor MP, as in FIG. 3. The information, which consists of n number of thermal radiation measurements, can be sent to the microprocessor from the thermal radiation detector and mathematically associated with the absorption constant, $\alpha$ for the specific fiber from which the radiation measurement was taken. Following the mathematical solution of the n number of simultaneous equations, as described above, the results can be automatically displayed on a readout device 22.

Figure 4A:
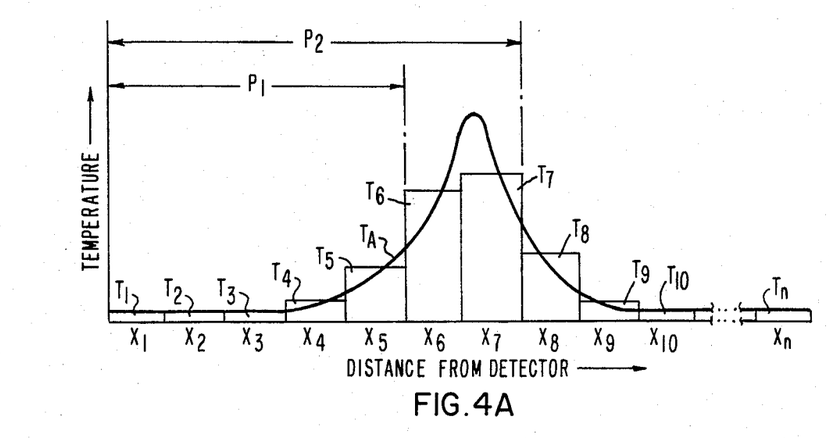
FIG. 4A is a graph of the actual and measured temperature distribution of an optical fiber cable constructed in accordance with the present invention.

FIG. 4A illustrates the results of a typical application of the present invention where the cable length is apportioned into n equal zones (i.e., $X_1, X_2, X_3 \ldots X_n$) and a corresponding temperature (i.e., $T_1, T_2, T_3 \ldots T_n$) is calculated for each zone. It should be readily understood by those skilled in the art that each temperature value is, in reality, an average value for the zone. If the temperature varies significantly within a zone, this average may represent an error when compared to either the minimum or maximum actual temperature within in the zone. This should be apparent in FIG. 4A where an exemplary hypothetical curve $T_A$ illustrates the actual temperature distribution which is represented by a plurality of discrete zone temperatures (i.e., $T_1, T_2, T_3 \ldots T_n$). It should be further apparent that the errors are greatest where localized heating occurs, such as in zones 5 to 8.

Since the lengths of the zones were arbitrarily chosen to be equal, they can just as easily be chosen to be any other convenient lengths. The choice of zone lengths has only two limitations: the total cumulative length of all zones on a particular fiber must equal the total length of the fiber and the zone length distribution must be identical for all fibers in the bundle for any single solution of the set of simultaneous equations described above.

Figure 4B:
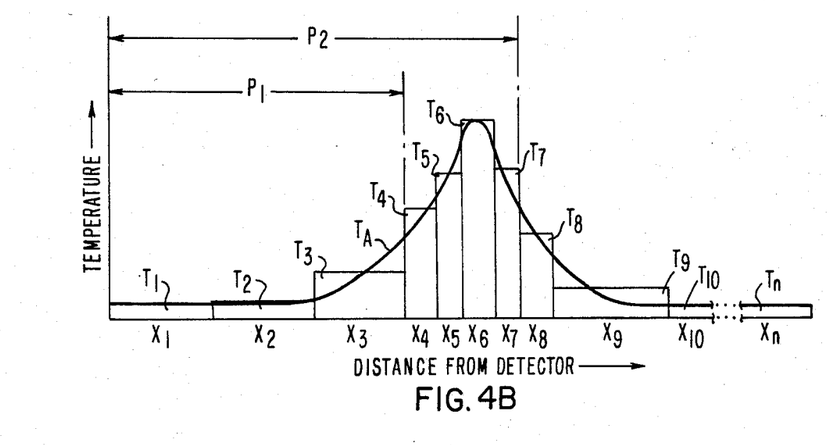
FIG. 4B demonstrates the increased accuracy that can be obtained by selectively reapportioning the zones shown in FIG. 4A.

Referring again to FIG. 4A, it should be obvious from the zone temperatures in the figure that the actual temperature peak is somewhere in the region of zones $X_6$ and $X_7$. Since all zones are equal and there are n zones, this means that the maximum temperature on the cable is somewhere between two points, $P_1$ and $P_2$, which are distances from the detector equal to $$P_1 = (5/n) L_c \tag{17}$$

$$P_1 = (7/n) L_c \tag{18}$$

where $L_c$ is the known cable length and n is the number of equal zones apportioned. The computer (reference numeral 20 in FIG. 3) can easily reapportion all of the zones of the cable in such a way that they are smaller between points $P_1$ and $P_2$ and larger in the other portions of the cable. FIG. 4B depicts this reapportionment and the obvious increase in accuracy at the location of the heated region. This reapportionment can be accomplished without the need for any additional radiation measurements by the detector 14 since the thermal radiation measurement for each fiber is a single value, TR, regardless of the zone apportionment.

The present invention anticipates many zone reapportionment techniques which are not limited to the method described above. For example, all of the zone lengths can be continually altered until the average error for all zones is minimized. Using root mean square (RMS) evaluations, the computer can, alternatively, perform repeated iterations to maximize the average accuracy of the temperature distribution over the entire cable length.

Figure 5:
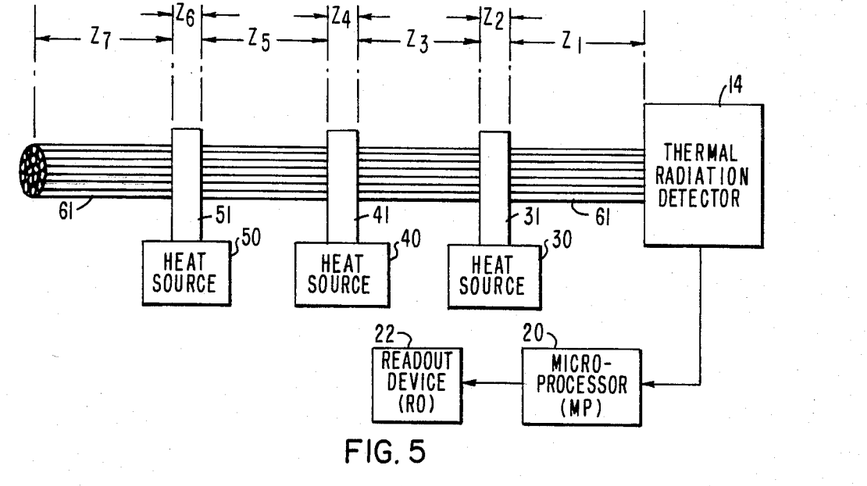
FIG. 5 illustrates an application of the present invention to monitor a specific number of selected potential heat sources using non-uniform zones.

A specific zone apportionment technique is depicted in FIG. 5. In certain situations, specific potential heat producing components are known and their temperature is critically more important than other surrounding elements. Three such potential heat producing components 30, 40 and 50 are shown in FIG. 5. A cable 61, made in accordance with the present invention, is passed near these components and placed in thermal contact with heat conducting mounts 31, 41 and 51 which are in thermal communication with the potential heat sources, 30, 40 and 50, respectively. Since the most likely sources of heat along the cable are thereby identified, the zones (i.e., $Z_1, Z_2, \ldots, Z_5$) can be apportioned in such a way as to dedicate a zone to each heat source by restricting the zone size to the length of cable contact with each heat conducting mount. In situations as described herein, the importance of monitoring the heat conducting mounts far outweighs the monitoring of the intermount spaces, $Z_1, Z_3, Z_5$ and $Z_7$. To improve the measurement accuracy in this type of application, the cable 61 in the intermount zones can be insulated to maintain them at a constant, known temperature. Although the simultaneous equations generated by this type of application will yield temperature values for every zone along the cable 61, particular attention can be paid to zones $Z_2, Z_4$ and $Z_6$ with appropriate threshold and alarm levels being applied to them.

If the zones, shown in FIG. 5 between the conducting mounts, are of a known temperature or their temperature can be determined by another means, their contributions to the total radiation received at the end of each fiber can be mathematically treated as known constants and the number of required fibers in the cable 61 can be reduced because of the reduced number of unknowns. Also, since the thermal radiation generated by any zone is a function of the temperature of that zone raised to the fourth power, zones $Z_1, Z_3, Z_5$ and $Z_7$ can be ignored if their temperatures are known to be significantly less than the zones within which the heat conducting mounts, 31, 41 and 51, are situated. In either of these two situations, the total number of required optical fibers can be significantly reduced.

As in other embodiments described above, a computer 20 will greatly facilitate the computations based on the thermal radiation measurements taken by the detector 14. Also, as described above, the results of these computations can be output to a suitable readout device 22.

From the description above, it should now be evident that the present invention provides a means for mapping the temperature distribution of an environment proximate a cable constructed in accordance with the present invention. Operationally, this cable is extended into the environment (e.g. an electrical generator) and components which are located adjacent to the cable are recorded as a function of their distance from one end of the cable. A typical application would consist of disposing the cable within the slot of a stator core, adjacent a stator coil. A thermal radiation detector is connected to the end of the cable in such a way as to be able to individually measure the total radiation emanating from each fiber. These values are transferred to a computer which then generates a series of simultaneous equations, as typified in equations 12, 13 and 14. Typically, on an initial iteration, the zone sizes are chosen to be of uniform dimensions. Since each fiber has a distinct absorption constant, $\alpha$, the computer must match each measured radiation value with the corresponding absorption constant in the appropriate one of the plurality of equations. Then the other known variables, including X, L and A, are applied to the set of equations and the computer solves the simultaneous equations for the values of W as described above. Since there are n number of fibers and n Ws, one for each zone, matrix manipulation or some other appropriate mathematical procedure will result in a unique value for each W as discussed above. The temperature, T, can be calculated since W is a function of T as demonstrated by equation 5, above. Thus, a temperature can be derived from each cable zone. Of course, the zone reapportionment techniques described above can then be used to refine the accuracy of the temperature mapping results during subsequent iterations of this process, if necessary. It should, however, be understood that no further radiation measurements are required since zone reapportionment is merely a mathematical manipulation of the measurements obtained from an optical fiber cable and detector system constructed in accordance with the present invention.

As discussed above, the present invention requires that each of the optical fibers has an absorption constant $\alpha$ which is measurably distinct from the other optical fibers in the cable. Although it is recognized that, in any assortment of apparently identical optical fibers, the absorption constants will vary slightly from one fiber to another, this variation is generally very small and insufficient to provide the measurable distinctiveness described herein. However, various methods are known to those skilled in the art which enable the absorption constant of an optical fiber to be altered. One method for altering the absorption constant of an optical fiber is disclosed in U.S. Pat. No. 4,302,970 which issued to Snitzer et al. on Dec. 1, 1981 and relates to the doping of the fiber's core. Another known technique is to degrade the fiber's core by exposing it to a radioactive environment. These and other known techniques can be used when optical fibers that exhibit measurably distinct absorption constants are not readily available from commercial sources.

It should be apparent that the present invention provides an apparatus and method for accurately determining the temperature distribution of an environment proximate a cable of optical fibers without the need for other temperature measuring devices or light sources within the environment. It should further be apparent that, although the invention has been described in considerable physical and methodological detail, it should not be considered to be so limited.

Figure 6:
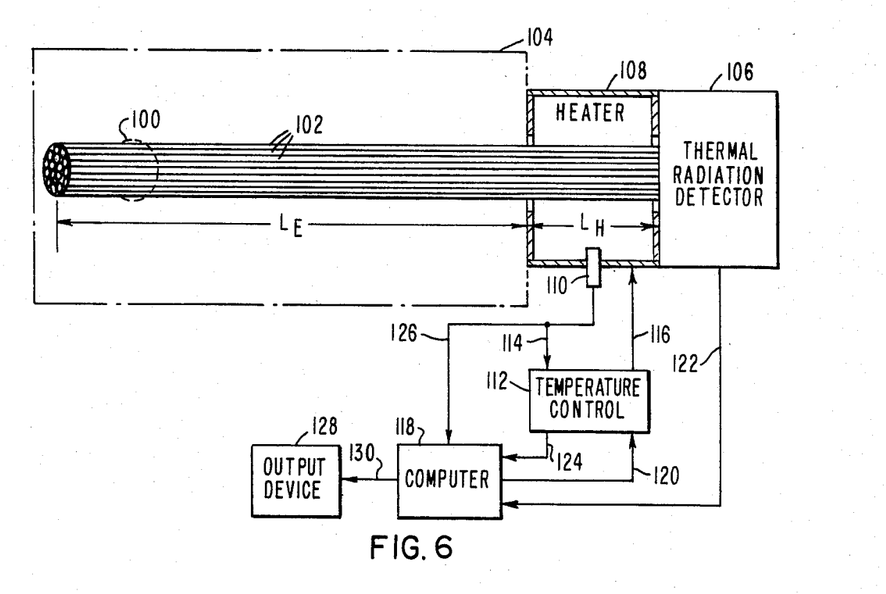
FIG. 6 illustrates the present invention arranged in a mode to be capable of determining the absorption constant of its optical fibers.

As should be apparent from the above discussion, the value of the absorption constant, $\alpha$, of each optical fiber of the cable must be known in order for the present invention to properly determine the temperature distribution of the cable's surrounding environment. As the present invention is used, it occasionally becomes necessary to calibrate it by reestablishing the values of each fiber's absorption constant. This is especially necessary in a nuclear environment because the absorption increases as the fiber is exposed to radiation but, due to heating, the optical fibers are annealed which lowers the absorption constant. These two coincident effects therefore make the absorption change as a complex function of time in a nuclear environment. This change necessitates periodic recalibration of the absorption constants of each optical fiber that is subjected to this type of environment. FIG. 6 depicts an exemplary arrangement for measuring the absorption constant, $\alpha$, of optical fibers.

FIG. 6 shows a cable 100 of optical fibers 102 disposed within an environment 104 whose temperature distribution is being monitored. One end of the cable 100 is connected to a thermal radiation detector 106 that is capable of individually measuring the thermal radiation emanating from each fiber 102 of the cable 100. Proximate the thermal radiation detector 106 is a heater 108 through which the cable passes as it extends from the detector 106 into the environment 104. The heater 108 is equipped with a temperature sensing device 110, such as a thermocouple, which is capable of accurately measuring the temperature of the heater 108 and, more importantly, the temperature of the portion of the cable which is inside of the heater 108.

It should be understood that the length of the cable 100, and therefore also of each fiber 102, comprises two sections. These are the length within the environment 104, referred to as $L_E$, and the length within the heater 108, referred to as $L_H$. Therefore, when the thermal radiation detector 106 measures a total radiation power level, $TR_T$, for a fiber, this power contains two additive components, $TR_E$ and $TR_H$, which emanate separately from these two fiber segments.

The heater 108 is connected to a temperature controller 112 which is capable of precisely maintaining a preselected temperature within the heater 108. The controller 112 can measure the temperature, through line 114, and control the power input to the heater 108, through line 116. A computer 118 can determine a preselected temperature and transmit it to the controller 112 through line 120. Furthermore, the computer 118 receives thermal radiation power measurements from the detector 106 on line 122 and acknowledgement from the controller 112, on line 124, that the heater temperature is stable at the preselected value.

The computer 118 can also be directly connected to the thermocouple 110, by line 126, to allow it to monitor the heater temperature independently of the controller 112. In order for the computer 118 to communicate with the operator, an output device 128 is connected to it by line 130.

During normal operation, when the temperatures of the environment 104 are being monitored, the heater 108 is either turned off or set at a low temperature near room temperature. The temperature distribution of the cable is determined, as described above and output on the device 128. This normal operation will generate temperature data for the portions of the cable within the environment 104, $L_E$, and within the heater 108, $L_H$. The calculated temperature of the cable within the heater can continuously be compared to its actual temperature measured by the thermocouple 110. In the event that an error is found during this comparison or for routine maintenance calibration purposes, the system shown in FIG. 6 can perform a systematic redetermination of the absorption constant, $\alpha$, of any or all of the fibers 102 in the cable 100 as described below.

The emanated thermal radiation power, $TR_T$, measured for a specific fiber 102 comprises two components, $TR_E$ and $TR_H$. If the heater 108 had been set at 20° C. this relationship can be expressed as $$TR_{T1} = TR_E + TR_{H20} \quad (19)$$

Assuming a relatively constant environment 104 temperature, the heater 108 can be then raised to a significantly higher temperature, for example 300° C., and stabilized. Then, a new power measurement can be made by the detector 106 to obtain the new relationship $$TR_{T2} = TR_E + TR_{H300} \quad (20)$$

The first power level, $TR_{T1}$, can then be subtracted from the second power level, $TR_{T2}$, to obtain $$TR_{T2} - TR_{T1} = TR_{H300} - TR_{H20} \quad (21)$$

Since the temperature of the fiber within the heater 108, $L_H$, was maintained constant throughout its length, it can be analyzed as a single fiber segment using equation 1 wherein all variables except $\alpha$ are known and the left side of equation 20, $TR_{T2} - TR_{T1}$, is the difference between two measured values. Therefore, the absorption constant, $\alpha$, can be derived for each fiber 102, individually, and the present invention can be accurately recalibrated.

It should also be apparent that, by taking a plurality of power measurements at selected temperatures, the relationship of the absorption constant as a function of the wavelength can be deduced from equations 1 and 11 as described below.

If the length of each zone of an optical fiber is considered to be infinitesimally small, the total emanated power from a single fiber can be expressed as $$TR_{total} = A \int_{\lambda_s}^{\lambda_l} \int_{\chi=0}^{\chi=X} \frac{C_1 \alpha e^{-\alpha \chi} d\chi d\lambda}{\lambda^5 (e^{C_2/\lambda T} - 1)} \quad (22)$$

which defines $TR_{total}$ as a function of temperature T, absorptivity $\alpha$, wavelength $\lambda$ and position x. It should also be noted that, in equation 21, the absorption constant $\alpha$ is a function of $\lambda$ and the temperature T is a function of x. It should be apparent that equation 21 can be equivalently expressed as the sum of many elements, with each element being a double integral taken over a finite range of $\lambda$. Within each of these small but finite bands of $\lambda$, the temperature T for the fiber and the absorption constant $\alpha$ within any specific band can be assumed to be constant. Therefore, the equation consists of the total radiation $TR_{total}$ defined as a function of an unknown absorption constant for each of the finite bands of $\lambda$ described above. The number of unknowns in the equation is therefore equal to the number of wavelength bands chosen and, if an equal number of equations can be generated at different temperature values, this series of equations can be solved and the absorption constant, $\alpha$, can be found for each band of wavelength, $\lambda$, chosen. It should be apparent to one skilled in the art that the present invention can be used to measure a series of radiation levels, each measured for a specific temperature setting, and thereby allow for the above-described mathematical solution which will yield the absorption constant of an optical fiber as a function of wavelength for a range of wavelengths over which the thermal radiation detector is operative.

It should be further understood that the present invention is not limited in application to optical fibers, but, in other arrangements, can similarly be used to measure the absorptivity of any translucent material, including both liquids and solids.

What I claim is:

1. An apparatus for determining the temperature distribution of an environment adjacent said apparatus, comprising:
a plurality of optical fibers associated in a cable arrangement having a first and a second end, each of said fibers extending an essentially identical distance between said first end and any preselected location on said cable, each of said fibers responding to said temperature of said environment by emitting thermal radiation independent of external light sources, each of said fibers selected to have an absorption constant which is measurably distinct from every other fiber in said cable;
means, operatively coupled to said first cable end, for measuring said thermal radiation generated by said fibers; and
means for mathematically deriving said temperature distribution by solving a plurality of simultaneous equations which are related to said measured thermal radiations emitted by said fibers.

2. The apparatus of claim 1 wherein:
said deriving means in an electronic circuit.

3. The apparatus of claim 2 wherein:
a computer comprises said electronic circuit.

4. The apparatus of claim 1, wherein:
each of said measurably distinct absorption constants is responsive to a preferred temperature range.

5. A temperature monitoring apparatus, comprising:
a plurality of optical fibers, each of said optical fibers being capable of emitting thermal radiation in response to the temperature of the environment proximate said fiber independent of external light sources, each of said fibers being made of a material selected to have a measurably different absorption constant than any other of said fibers;
means for measuring said thermal radiation emitted by each of said fibers, said measuring means being operatively coupled to a preselected end of each of said fibers; and
a microprocessor means for performing calculations to solve a plurality of simultaneous equations which are based on said measurably different absorption constants and the magnitude of said thermal radiation measured by said measuring means.

6. The apparatus of claim 5, wherein:
said measuring means is capable of measuring said thermal radiation over a range of wavelengths which encompasses a preselected temperature range which is being monitored.

7. The apparatus of claim 5 wherein:
said plurality of optical fibers is attached to a plurality of elements to be measured, each of said plurality of elements being connected to said plurality of optical fibers.

8. The apparatus of claim 5 wherein:

said plurality of optical fibers is bundled in such a way as to form a first and a second end of said bundle with each of said plurality of optical fibers having one of its ends proximate said first end, said first end comprising the preselected end of each fiber which is operatively coupled to said measuring means, and a first preselected point on any of said fibers being proximate a second preselected point on any other fiber which has the identical length of fiber between said second point and said first end as said first point has between said first point and said first end.

* * * * *